(12) United States Patent
Paiva et al.

(10) Patent No.: US 10,605,940 B2
(45) Date of Patent: Mar. 31, 2020

(54) METHOD FOR SELECTING HORIZON SURFACES

(71) Applicants: Antonio R. C. Paiva, Branchburg, NJ (US); Amit Kushwaha, The Woodlands, TX (US); Pavel Dimitrov, Spring, TX (US); Matthias G. Imhof, Katy, TX (US)

(72) Inventors: Antonio R. C. Paiva, Branchburg, NJ (US); Amit Kushwaha, The Woodlands, TX (US); Pavel Dimitrov, Spring, TX (US); Matthias G. Imhof, Katy, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 269 days.

(21) Appl. No.: 15/092,766

(22) Filed: Apr. 7, 2016

(65) Prior Publication Data

US 2016/0377753 A1 Dec. 29, 2016

Related U.S. Application Data

(60) Provisional application No. 62/183,919, filed on Jun. 24, 2015.

(51) Int. Cl.
*G01V 1/34* (2006.01)
*G01V 1/30* (2006.01)

(52) U.S. Cl.
CPC .............. *G01V 1/345* (2013.01); *G01V 1/302* (2013.01); *G01V 2210/64* (2013.01); *G01V 2210/643* (2013.01)

(58) Field of Classification Search
None
See application file for complete search history.

(56) References Cited

U.S. PATENT DOCUMENTS

| 5,671,344 | A | 9/1997 | Stark |
| 5,809,490 | A | 9/1998 | Guiver et al. |

(Continued)

FOREIGN PATENT DOCUMENTS

| EP | 1 228 385 | 8/2008 |
| WO | WO 1993-001508 | 1/1993 |

(Continued)

*Primary Examiner* — Reema Patel
*Assistant Examiner* — Steven M Christopher
(74) *Attorney, Agent, or Firm* — ExxonMobil Upstream Research Company-Law Department

(57) ABSTRACT

A method to select a representative subset of a plurality of horizon surfaces or surface patches from geophysical subsurface imaging data, including: defining a score function on one or more horizon surfaces or surface patches; calculating, by a computer, the score for each of the plurality of horizon surfaces or surface patches with regard to other horizon surfaces or surface patches and whether the other horizon surfaces or surface patches have been selected or not for inclusion or exclusion in the subset of the plurality of horizon surfaces; selecting, by a computer, one or more of the plurality of horizon surfaces or surface patches to be included in the subset of the plurality of horizon surfaces or surface patches or excluded from the subset of the plurality of horizon surfaces or surface patches based on their respective scores; iteratively repeating the selecting and calculating steps until a stopping condition is reached and the subset of the plurality of horizon surfaces or surface patches is determined; and performing interpretation on the subset of the plurality of horizon surfaces or surfaces patches.

13 Claims, 7 Drawing Sheets

(56) References Cited

U.S. PATENT DOCUMENTS

| | | |
|---|---|---|
| 5,933,790 A | 8/1999 | Jeffryes |
| 6,128,577 A | 10/2000 | Assa et al. |
| 6,131,071 A | 10/2000 | Partyka et al. |
| 6,138,076 A | 10/2000 | Graf et al. |
| 6,571,177 B1 | 5/2003 | Hardy |
| 6,708,118 B2 | 3/2004 | Stark |
| 6,850,845 B2 | 2/2005 | Stark |
| 6,853,922 B2 | 2/2005 | Stark |
| 6,950,786 B1 | 9/2005 | Sonneland et al. |
| 6,977,866 B2 | 12/2005 | Huffman et al. |
| 7,069,149 B2 | 6/2006 | Goff et al. |
| 7,283,911 B2 | 10/2007 | Fitzsimmons et al. |
| 7,542,037 B2 | 6/2009 | Fremming |
| 7,706,981 B2 | 4/2010 | Wilkinson et al. |
| 7,769,545 B2 | 8/2010 | Lomask et al. |
| 7,769,546 B2 | 8/2010 | Lomask et al. |
| 7,796,469 B2 | 8/2010 | Keskes et al. |
| 7,859,942 B2 | 12/2010 | Stork |
| 8,213,261 B2 | 7/2012 | Imhof et al. |
| 8,219,322 B2 | 7/2012 | Monsen et al. |
| 8,447,524 B2 | 5/2013 | Chen et al. |
| 8,566,069 B2 | 10/2013 | Pauget et al. |
| 8,649,980 B2 | 2/2014 | Gulati |
| 8,903,834 B2 | 12/2014 | Ciancutti et al. |
| 9,134,443 B2 | 9/2015 | Hoekstra |
| 2001/0036294 A1* | 11/2001 | Keskes .................. G01V 1/30 382/109 |
| 2008/0140319 A1* | 6/2008 | Monsen ................ G01V 11/00 702/16 |
| 2008/0285384 A1 | 11/2008 | James |
| 2009/0099778 A1 | 4/2009 | Kavanagh et al. |
| 2011/0115787 A1 | 5/2011 | Kadlec |
| 2012/0234554 A1* | 9/2012 | Kumaran ............... G01V 1/325 166/369 |
| 2013/0129256 A1 | 5/2013 | Robinson et al. |
| 2013/0286782 A1 | 10/2013 | Vyas et al. |
| 2014/0303896 A1 | 10/2014 | Wrobel et al. |
| 2014/0372230 A1 | 12/2014 | Ray et al. |
| 2014/0372454 A1 | 12/2014 | Walker et al. |

FOREIGN PATENT DOCUMENTS

| | | |
|---|---|---|
| WO | 2008/005690 | 1/2008 |
| WO | 2010/042731 | 4/2010 |
| WO | WO 2011-149609 A1 | 12/2011 |
| WO | WO 2014-065891 A1 | 5/2014 |
| WO | WO 2014-092713 A2 | 6/2014 |

* cited by examiner

METHOD FOR SELECTING HORIZON SURFACES

CROSS-REFERENCE TO RELATED APPLICATION

This application claims the benefit of U.S. Provisional Patent Application 62/183,919 filed Jun. 24, 2015 entitled METHOD FOR SELECTING HORIZON SURFACES, the entirety of which is incorporated by reference herein.

FIELD OF THE INVENTION

The exemplary embodiments described herein relate in general to the field of geophysical prospecting and, in particular, to the analysis of seismic or other geophysical subsurface imaging data. More specifically, the exemplary embodiments describe a method to rank or select seismic horizon surfaces or patches thereof according to a specified criterion.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Geophysical prospecting involves the interpretation of geophysical subsurface imaging data, such as seismic, with the goal of building a conceptual model of the subsurface. This model is constructed by an interpreter by decomposing the subsurface into multiple interacting geologic features. In this process, interpreters often map features, or their boundary, using horizon surfaces (or simply "horizons" or "surfaces") corresponding to different layers of rock or representing stratigraphic boundaries. If the horizon surfaces have limited areal extent with regard to a seismic volume they pertain, then they may be referred to as horizon patches or surface patches.

Given the importance of horizons for subsurface interpretation, methods have been developed to assist in detecting and mapping horizons within a seismic volume. There are a number of methods for mapping individual horizons based on seed points or constraints from which the horizon mapping method can extrapolate and map a horizon. Those methods assist in mapping one horizon at a time but typically interpreters need to map several horizons that characterize different geologic features or events.

More recently, methods have been proposed to map all peaks and troughs in a seismic volume in an automated fashion. These methods can be said to "skeletonize" a seismic volume and yield horizon surfaces or patches thereof. Examples of such methods include U.S. Pat. No. 8,213,261, "Method for geophysical and geological interpretation of seismic volumes in the domains of depth, time, and age", by Matthias Imhof et al. and U.S. Pat. No. 8,566,069, "Method for geologically modeling seismic data by trace correlation", by Fabien Pauget et al. Automated horizon mapping methods are useful interpretation tools because they preprocess the data and yield a dense stack of surfaces from which the interpreters can build upon. U.S. Pat. Nos. 8,213,261 and 8,566,069 are hereby incorporated by reference in their entirety.

There is extensive literature on methods for ranking and selecting in the context of database search results, content retrieval, and content delivery:

Patent Application US2014/0372454A1, "Method, system and apparatus for efficiently determining priority of data in a database", by David R. Walker et al.;

Patent Application US2014/0372230A1, "Systems and methods for selecting and serving content items based on view probability", by Jonathan W. Ray et al.; and U.S. Pat. No. 8,903,834, "Recommending groups of items based on item ranks", by John Ciancutti et al.

Each of the above documents is hereby incorporated by reference in their entirety.

These methods are not applicable to the problem addressed by the present technological advancement because of the very different nature of the problem and its formulation. More fundamentally, they are designed to work with only a specific parametric form of a scoring function that is integrated in the solution to the problem and from which only the scoring function's parameters can be changed.

In contrast, in the present technological advancement, virtually any scoring function pertaining to the problem of selecting or ranking surfaces, or patches thereof, may be used. Moreover, the scoring function can be specified as an input to a method embodying the present technological advancement.

The literature also includes some examples of ranking of objects pertaining to hydrocarbon exploration or production:

International Patent Application WO2014/092713A2, "System, method and computer program product for evaluating and ranking geobodies using a Euler characteristic", by Travis St. George Ramsay and Jeffrey Marc Yarus;

International Patent Application WO2014/065891A1, "System and method for analysis of trap integrity", by Christian Hager et al.

Patent Application US2014/0303896A1, "Method for Quantitative Definition of Direct Hydrocarbon Indicators", by Kelly Wrobel et al.; and International Patent Application WO2011/149609A1, "Method for seismic hydrocarbon system analysis", by Matthias Imhof et al.

Each of the above documents is hereby incorporated by reference in their entirety.

U.S. Pat. No. 8,447,524, the entire contents of which are hereby incorporated by reference, describes a method that takes a typically large number of subsurface regions and analyzes them to automatically select or highlight the more relevant ones. An alternative embodiment of this method does not select regions, but instead ranks the regions based on their relevance as determined by their analysis. In the former case, the interpreter or a computer-based system continues work with a greatly reduced subset of regions. In the latter case, work may be continued with all regions, but time and resources are allocated based on the region ranks. In the context of this invention, a region is a collection of cells, or voxels, in a subsurface volume defined by one or more objects such as surfaces or geobodies. Moreover, the step of high-grading the objects encompasses, for example, selection, highlighting, prioritizing, or ranking. Different embodiments and parameterizations can be cascaded to sequentially remove ever more low priority regions or to improve the rankings.

None of these disclosures addresses the problem of ranking or selecting horizon surfaces or patches. Except for U.S. Pat. No. 8,447,524 and patent application WO2011/

149609A1, these methods rely on a single parametric form of scoring function that is specific to the area of those disclosures which, as mentioned above, is different from the way scoring functions are used in the present technological advancement.

SUMMARY

A method to select a representative subset of a plurality of horizon surfaces or surface patches from geophysical subsurface imaging data, including: defining a score function on one or more horizon surfaces or surface patches; calculating, by a computer, the score for each of the plurality of horizon surfaces or surface patches with regard to other horizon surfaces or surface patches and whether the other horizon surfaces or surface patches have been selected or not for inclusion or exclusion in the subset of the plurality of horizon surfaces; selecting, by a computer, one or more of the plurality of horizon surfaces or surface patches to be included in the subset of the plurality of horizon surfaces or surface patches or excluded from the subset of the plurality of horizon surfaces or surface patches based on their respective scores; iteratively repeating the selecting and calculating steps until a stopping condition is reached and the subset of the plurality of horizon surfaces or surface patches is determined; and performing interpretation on the subset of the plurality of horizon surfaces or surfaces patches.

In the method, the performing can include using the subset of the plurality of horizon surfaces or surface patches to derive a geologic model that is compatible with the geophysical subsurface imaging data.

The method can further include generating an image of the subset of the plurality of horizon surfaces or surface patches.

In the method, the performing can include using the image to derive a geologic model that is compatible with the geophysical subsurface imaging data.

In the method, the performing can include generating, by a computer, a subsurface attribute from the subset of the plurality of horizon surfaces or surface patches.

In the method, one or more attributes can correspond to properties above, bellow, and/or at the surface and/or neighboring surfaces or surface patches are used in calculating the score.

In the method, the score can characterize how well a surface or surface patch segments the subsurface into layers or zones.

In the method, the score of a surface or surface patch can define a layer or zone with regards to another surface or surface patch.

In the method, the score function can be defined such that it minimizes the approximation error in calculating an attribute from the selected subset.

In the method, the score function can be defined such that it minimizes the approximation error from interpolating surfaces from the selected subset.

In the method, the score function can be defined such that selected surfaces are constrained to have a degree of spatial uniformity, spatial separation, or sparseness.

In the method, the iterative process can be repeated until the number of selected surfaces reaches a given limit k or the scores of the unselected surfaces are below a given value.

In the method, a tradeoff curve analysis can be used to determine the number k of horizon surfaces or surface patches to select.

In the method, the calculating and selecting can be performed for the inclusion of the horizon surfaces or surface patches in the subset.

In the method, the calculating and selecting can be performed for the exclusion of the horizon surfaces or surface patches from the subset.

The method can further include using an interpretation of the subsurface generated from the subject of horizon surfaces or horizon patches for hydrocarbon management.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Figure 1:
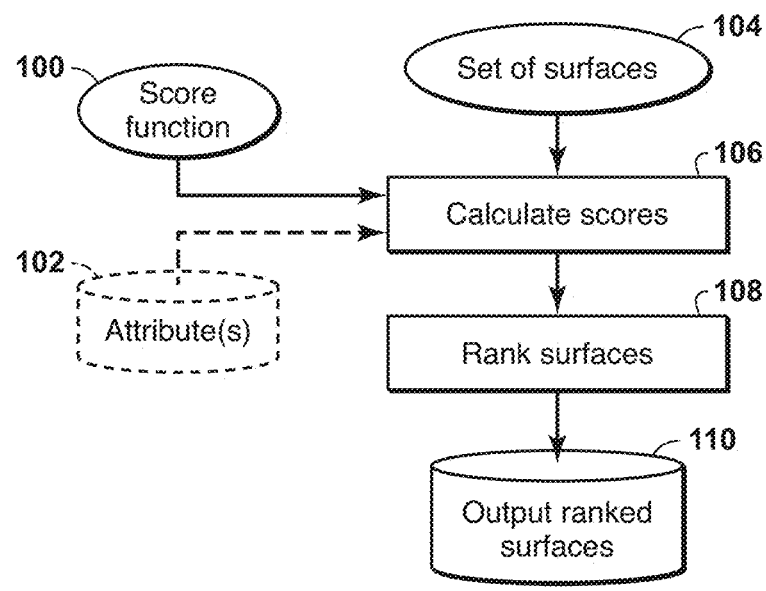
FIG. 1 depicts an exemplary surface ranking method.

Exemplary embodiments are described herein. However, to the extent that the following description is specific to a particular, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

Exemplary embodiments are described herein, wherein like reference numbers refer to similar elements. However, to the extent that the following description is specific to a particular, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

Note that the present technological advancement applies equally to surfaces, or surface patches, or combinations thereof, since the latter is simply a surface with smaller spatial extent. Although in the text that follows, we will refer only to surfaces, it should be understood that the same extends and applies directly if one is working with surface patches or both surfaces and surface patches.

Overview

Many of the surfaces obtained through the automated horizon mapping methods discussed in the Background Section are not of significant interest, at least for initial interpretation. Hence, presenting all of them to an interpreter without further analysis may be counterproductive or even mislead the interpreter because they may clutter or even hide those surfaces that are truly relevant to understanding a given aspect of interest in the subsurface. Consequently, it is useful to have an approach to sort the surfaces based on their relevance. This involves assigning a value based on a score function to surfaces, wherein the score function may depend on the nature of the surface or attribute(s) at, above and/or below the surface and expresses some aspect of a particular geologic feature of interest. Thus, the score function may be interpreted as a "measure of relevance" with regards to the geologic concept it expresses, and, by sorting the surfaces by their score, the method would provide a ranked list of surfaces. If necessary, surfaces could then be selected by keeping only some subset of this list.

Alternatively, one may note that considering the dense stack of surfaces has computational implications in terms of computation speed and memory used when these are visualized or further analyzed by some process or operation. Hence, it can be advantageous to consider only a subset of those horizons for subsequent analysis. In this case, one would want to select a subset that is representative of the crucial aspects in the whole set of surfaces with regards to the "score" value and, for example, a bound of the approximation error incurred or the maximum number of surfaces selected.

Given a stack of horizon surfaces or horizon patches, the present technological advancement can be embodied as a method to rank or select a relevant subset of the full stack of surfaces or patches. For ranking, the method can proceed as schematically represented in FIG. 1. Simply put, a user provides as input a set of surfaces (104) and a score function (100) that reflects how relevant or important a surface is for a given problem. If needed by the scoring function, one or more attributes (102) associated with the surfaces are also given. The method then calculates the score for each surface (106) and ranks the surfaces by sorting them according to the value returned by the measure (108). The sorting order, i.e., ascending or descending, depends on the specific meaning of the score and is an implicit input. It can be thought as being part of the definition of the scoring function (100). In step 110, the ranked surfaces are outputted.

The use of the present technological advancement for ranking can be naturally extended for selection of surfaces. There are primarily two selection approaches with which to apply the present technological advancement. They differ primarily in whether the score function (100) can be applied to each surface independently or the score can depend on interactions with other surfaces, their score, and/or whether they have been selected. In the first approach, depicted in FIG. 2, the method may start by ranking the surfaces and then selecting the "top" k surfaces (200). (Note that "top" is a relative term because it depends on whether the surfaces are sorted in ascending or descending order. Those of ordinary skill in the art understand that a subset of surfaces can be extracted, whether they are at the top, bottom, or somewhere in between). In step 202, the selected surfaces are outputted.

Figure 3A:
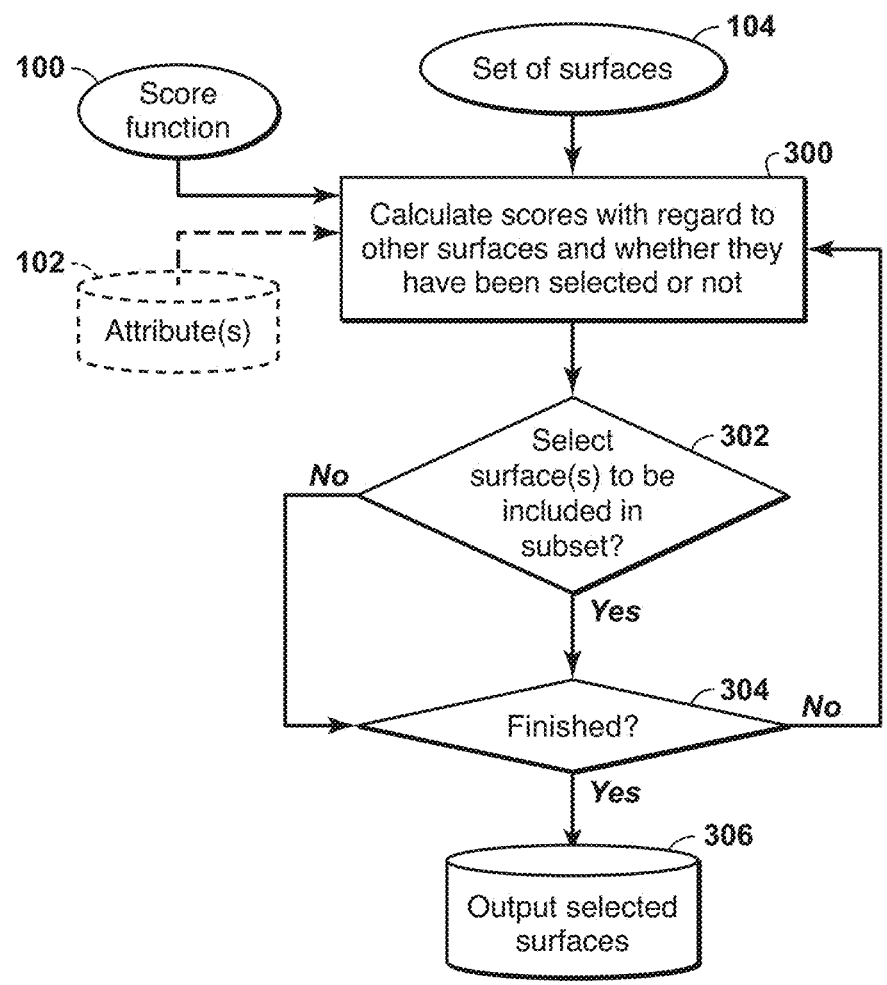
FIG. 3A depicts an exemplary surface selection method.
Figure 3B:
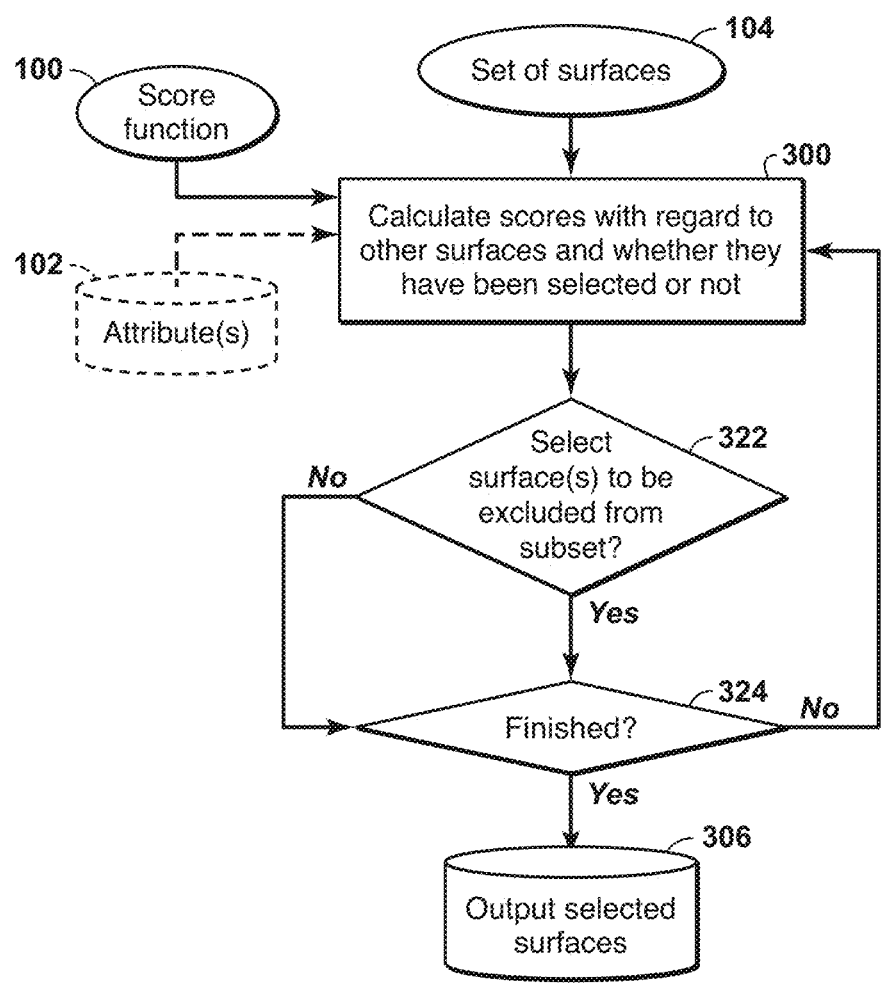
FIG. 3B depicts an exemplary surface selection method.

The second approach is depicted in FIGS. 3A and 3B. The method iterates and reevaluates the score function with regard to the other surfaces and whether they have been selected or not (300). The reason is that, since the score of a surface can depend on interactions with other surfaces, the selection of a surface can have particular significance as to whether another surface is selected or not. Based on the scores, one or more surfaces are selected (302) if appropriate. As discussed in greater detail below, the concept represented in FIGS. 3A and 3B, for example, is that the surfaces that have already been selected become reference surfaces. Conceptually, as the method progresses, it checks if an unselected surface (the "target") is well represented by one of the surfaces that have been selected (the "reference") and, if it is not (i.e., error=score is large), the target surface is selected. The process is repeated until a stopping condition (304) is reached, such as whether a given number of selected surfaces was been reached or the scores are below a given value. Then the selected surfaces can be outputted (306) for editing by an interpreter or for the calculation of a subsurface parameter/attribute.

FIG. 3B shows another process for selecting surfaces that turns the process depicted in FIG. 3A on its head. Instead of starting with an empty set of select surfaces and adding surfaces to it, one can start with all surfaces selected and determining which surfaces to remove (322). Of course, in this approach the score function is used to establish which surfaces are least important (which is simply the inverse of their importance).

The generated subset of horizon surfaces or horizon patches can be used to explore for hydrocarbons. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

In summary, the present technological advancement gives rise to two main embodiment types. The first embodiment pertains primarily to the ranking of surfaces and for which the goal is to order the surfaces with certain properties such that the most informative surfaces are presented to the user first. This embodiment type is perhaps most useful in the context of surfaces with certain geological properties of interest, which the present technological advancement can assist in identifying. The second embodiment is most commonly associated with the selection of surfaces such that subsequent processes can be applied to the selected subset. If the surfaces in the subset can be selected such that they are representative of characteristics over the whole set of surfaces, then the selection allows one to focus only on this subset. This embodiment may be most useful, for example, in the context of computationally expensive processes, in which the selection would allow such processes to run faster and more efficiently.

Geological Surface Ranking Example Embodiment

A first embodiment of the present technological advancement involves the ranking of geological surfaces, and might follow a direct implementation of the steps in FIG. 1. In this case, the goal might be to provide interpreters with an approach with which to search for surfaces that have a geologic characteristic of interest. In this type of embodiment, the aim is typically to rank the surfaces such that surfaces deemed more relevant are looked at first. The benefits of this capability are that interpreters may, for instance, more quickly identify and assess surfaces corresponding to specific stratigraphic events or features, and potentially cluster them into geologic time intervals of interest or stratigraphic packages.

Naturally, the ranking must be guided via a user-provided score function (100). Such a function may optionally also implement a multi-attribute analysis of the properties above, below, and/or at the surface and/or neighboring surfaces (102). In this embodiment, the score function achieves two main purposes: (i) to express a geological characteristic of interest and (ii) to quantify how well the surface properties and/or the multi-attribute analysis correlates with the geological characteristic.

Since closely related surfaces describe correlated geological properties and the analysis and score results may depend on neighboring surfaces, the score result on a surface may depend on the score of other surfaces. It is important to note that there may be circumstances in which the score of a surface may depend on the score of other surface(s) which in turn depend on the score of the first surface. It is assumed that this circular reference problem (colloquially referred to as the "chicken-and-egg" problem) has been addressed within the definition of the score function such that it has proper convergence properties, meaning that if one iterates on the dependencies of the score values they shall converge to stable values. This convergence can occur either in an implicit form (i.e., there is a known asymptotic solution as if we were to iterate an infinite number of times) or in an explicit form (i.e., one simply iterates the score function interactions with other surfaces using their partial or temporary score values until the values change negligibly). In those circumstances, the interactions between surfaces are accounted for entirely within the scoring step (106).

Figure 2:
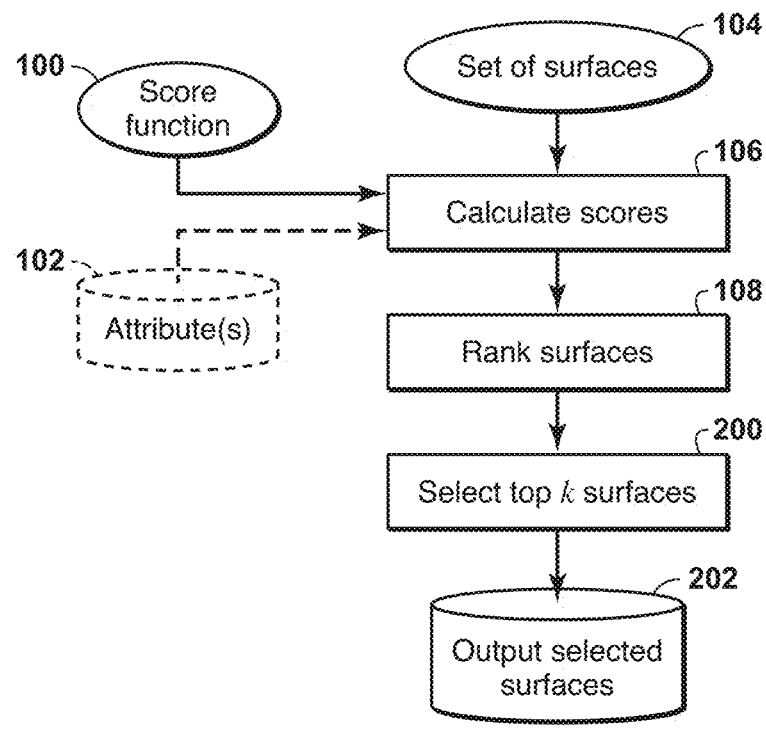
FIG. 2 depicts an exemplary surface selection method.

It is important to note that although the embodiment is mentioned primarily with the goal of ranking surfaces, similar ideas can applied to the goal of surface selection. The premise is that in the case of selection of geologically relevant surfaces the method would be coupled with some approach to determine how surfaces are to be selected. Methods like those illustrated in FIG. 2, 3A, or 3B can be used. If a surface's score does not depend on which surfaces have been selected, this can be achieved by additionally selecting the top k surfaces (200), as depicted in FIG. 2. However, if the interactions between surfaces are such that a surface's score depends on which surfaces have been selected, then one can use an approach akin to that illustrated in FIG. 3A or 3B to account for and handle those dependencies.

Figure 4:
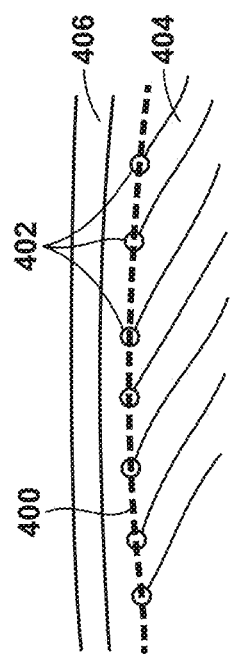
FIG. 4 depicts an example of angular unconformity.

As mentioned, the present technological advancement can be used to rank (or select) surfaces such that those that fit within a given geological characteristic of interest are ranked higher (resp., selected). Some examples of specific geological characteristics of interest might be:

i. Highlighting through-going surfaces: A first step in the analysis of a stack of surfaces is typically to quality check the result. Accordingly, one might be interested in highlighting through-going surfaces because they provide large surfaces with large spatial extent that correlate well with the seismic data and with regard to which an interpreter may more easily assess the quality of other surfaces. The score function for this example might simply be the seismic variance at or in an interval around the surface, wherein lower variances indicate surfaces that are more likely to be through-going.

ii. Detection of angular unconformities: As depicted in FIG. 4, an angular unconformity is a geologic boundary corresponding to a gap in geologic time and denoted by an erosional surface 400 with terminations 402 at or closely below due to angled strata 404 and with mainly conformal strata 406 above the unconformity 404. In this case, the score function could be a weighted difference between the number of terminations at or below the surface and the number of terminations and degree of conformal strata above the surface.

iii. Detection of potential top of reservoir surfaces: Although there are many geological scenarios potentially associated with a top of reservoir surface, one scenario of interest might be associated with low amplitudes and/or a chaotic signature above, which may correspond to a seal rock, and higher amplitude and low chaotic signature at and below the surface, which may correspond to a reservoir rock. Again, the score function could be defined based on some appropriately weighted difference of these attribute properties.

Figure 5:
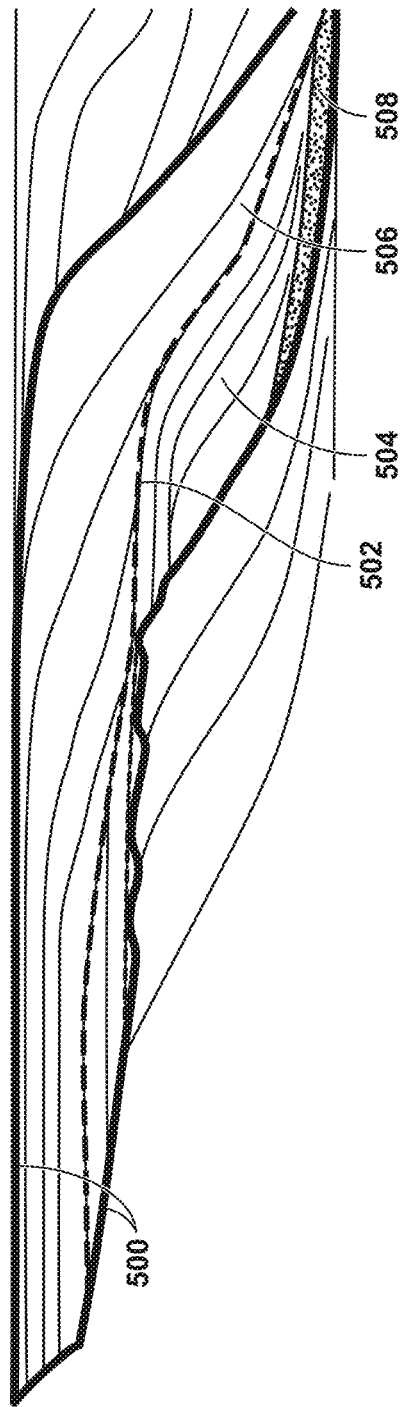
FIG. 5 depicts an example of a depositional sequence model.

Additional scenarios could be conceived to highlight, one at time, different stratigraphic surface types (e.g., sequence boundary 500, transgressive surface 502, lowstand wedge (seal) 504, distal highstand (seal) 506, lowstand fan (reservoir) 508, etc., depicted in FIG. 5). Of course, this assumes that an appropriate user-specified score function is provided as input for each surface type.

Note that the surface neighboring operations (above/below) are to be defined with regard to either an interval of interest associated with the surface or a filtering operation on the attributes that migrates the information such as to make it accessible directly at the surface level.

It is also important to observe that, by selecting surfaces, one is of course also segmenting the volume into zones or layers bound by the selected surfaces. This is clearly demonstrated in two of the above-mentioned examples (ii. and iii.), which highlight situations where the geologic characteristics of the surfaces of interest define geologic boundaries. Of course, if the ultimate goal is to rank selected surface layers, one can adjust the methods disclosed to make that analysis more explicit. This can be achieved by designing score functions that, in addition to how well a surface is an appropriate layer boundary, score surfaces based on how well they relate to other potential layer boundary surfaces. This latter perspective has three main advantages: (i) it allows for enforcing spatial and geologic consistency by relating a potential boundary surface to other layer boundaries, (ii) the boundary surfaces are automatically paired as part of the ranking/selection process, and (iii) it allows for layers to be defined at multiple scales since layers can be defined to encompass other layers, as can occur in geology.

Selection of Surfaces for Attribute Calculation Example Embodiment

Another exemplary embodiment pertains to quantitative geophysical analysis and computation. Given a large number of surfaces on which to perform a given geophysical computation or calculate an attribute, the computation may be slow and resource intensive. In that context, the proposed method can be used as a screening tool to select surfaces in which to focus the computation of compute intensive attributes or to facilitate quantitative analysis by a user. In other words, the proposed method provides an approach to select a subset of the horizon surfaces to be considered for subsequent analysis. This may not only reduce the burden on the user, for example, by reducing the surfaces on which a user needs to quality check the results of the computation, but it can also reduce the computation time and the computing resources needed.

Naturally, the selection of a subset of surfaces for analysis might impose some approximation error or loss of resolution on the result of the subsequent analysis. Indeed, there is a trade-off between the number of selected surfaces (of which an increase is likely to decrease error) and the benefits in selecting a subset of surfaces. An additional advantage of the method in this context is that, by carefully selecting the score function such that it reflects the approximation error (or its reciprocal), one can select surfaces that are most likely to yield the smallest error for the number of surfaces selected. Consequently, the method provides a better overall approximation tradeoff.

As an application example of this embodiment, consider the calculation of the enclosure attribute disclosed in U.S. Pat. No. 8,213,261. The calculation of the enclosure attribute on a given surface is an inherently serial process and can be time consuming for large surfaces. When dealing with a large number of surfaces, the compute time can then become too large for some applications. Hence, the goal is to quickly obtain a result. One possible approach is to select a subset of the surfaces on which to calculate the closure attribute such that the main enclosures in the data are captured.

A score function for this task might aim to capture relative changes in surface height and geometry with regards to other surfaces because they could be indicative of how much the enclosing geometries associated with a surface, if any, differ than from those associated with other surfaces. Put differently, if the enclosures associated with a given surface are likely to be the same or very similar to those associated with an already selected representative surface, then that surface does not need to be considered further because those enclosures will be represented in the attribute calculation by the already selected surface. Two exemplary score functions for this task might be:

$$e_\infty(S_t,S_r)=\min_\delta \max_{i,j}|S_t(i,j)-S_r(i,j)-\delta| \quad \text{i.}$$

$$e_1(S_t,S_r)=\min_\delta \sum_{i,j}|S_t(i,j)-S_r(i,j)-\delta| \quad \text{ii.}$$

where $S_t$ and $S_r$ denote a "target" and "reference" surface, $S_t(i,j)$ and $S_r(i,j)$ are their respective depth, height or time value at location (i,j), and $\delta$ denotes a depth, height or time shift to be minimized in order to obtain the error. Notice that these score functions are examples in which the score depend on whether a surface has been selected or not. For example, in the context of FIG. 3A, the score is evaluated only for unselected surfaces (being considered for selection), which are the target, using the surfaces already have been selected as reference. The general idea is that the method checks if an unselected surface is well represented by one of the (reference) surfaces that have been selected and, if it isn't (meaning that it's score/error is large), the surface is selected.

The first score function represents the minimum $1^\infty$ distance (i.e., maximum absolute difference) between the target surface $S_t$ and the vertically shifted reference surface $S_r$ for an appropriate time/depth shift $\delta$. Similarly, the second score function represents the minimum $1^1$ distance (i.e., average absolute difference) between the surfaces (wherein 1 is a discrete space; see, for example, $L_p$ spaces and sequence space).

Of course, a crucial premise for this effort to be useful is that the surface selection method must be much simpler and faster than that of calculating the attribute itself. Indeed, either of the above score functions (and the corresponding $\delta$ parameter) can be evaluated with linear computational complexity (referred to as $\mathcal{O}(N)$ in the art, meaning that the computation time is directly proportional to the size of the surfaces). More specifically, we have that:

$$e_\infty(S_t,S_r)=(\max_{i,j}|S_t(i,j)-S_r(i,j)|-\min_{i,j}|S_t(i,j)-S_r(i,j)|)/2$$
(corresponding to $\delta=(\max_{i,j}|S_t(i,j)-S_r(i,j)|+\min_{i,j}|S_t(i,j)-S_r(i,j)|)/2$) \quad i.

$$e_1(S_t,S_r)=\sum_{i,j}|S_t(i,j)-S_r(i,j)-\delta|, \text{ with } \delta=\text{median}_{i,j}(S_t(i,j)-S_r(i,j))) \quad \text{ii.}$$

Figure 6:
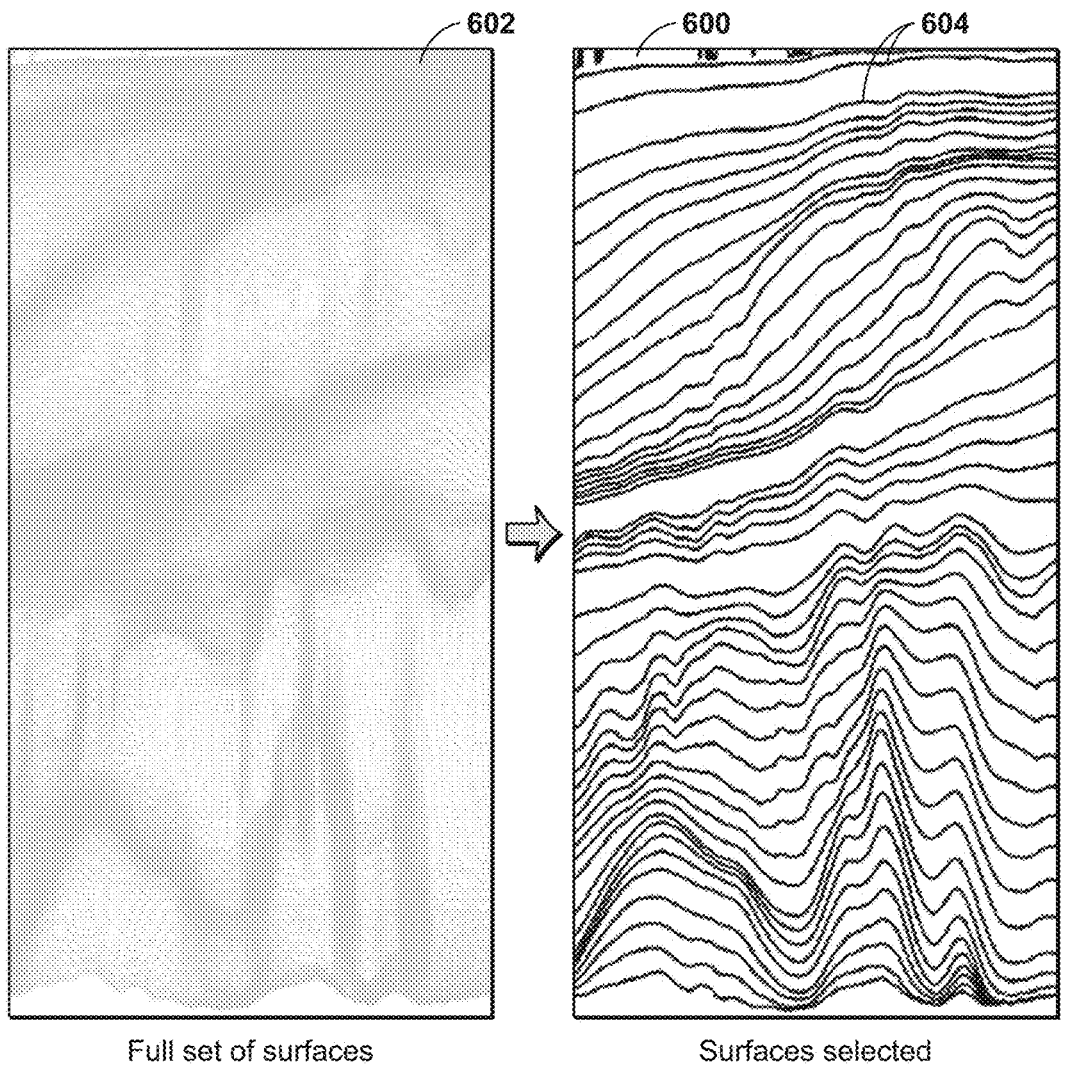
FIG. 6 depicts an example of surface selection for calculation of an enclosure attribute overlaid on a seismic line.

FIG. 6 illustrates the example embodiment applied for selection of surfaces for the calculation of the enclosure attribute. Using the $e_\infty$ score function and according to the process in FIG. 3A, the method selected only 51 surfaces (604) out of an initial set of 600 surfaces (602).

Although most score functions, such the ones exemplified above, tend to naturally incentivize a certain separation between selected surfaces, this occurs implicitly. This happens because surfaces close to an already selected surface tend to be similar to them and thus will have a lower score. However, in some cases one might want to explicitly enforce spatial separation, uniformity, or sparseness properties. This can be easily achieved by incorporating term(s) in the score functions terms which decrease the score, and thus decrease the likelihood of selection, of surfaces that do not match the desired properties. If they need to be enforced as a constraint, one can simply design the score function such that it leads to a very small score if the constraint is not respected.

Selection of Surfaces for Interactive Editing and Visualization Example Embodiment Yet another exemplary embodiment of the present technological advancement may pertain to the selection of surfaces for interactive editing and visualizing. Although having a large number of surfaces as a starting point can be useful to an interpreter, manipulating/editing these surfaces can be computationally demanding which can hinder interactivity and, in an extreme case, make their use unacceptable for a user. In addition, visualizing these surfaces can yield a cluttered display, potentially occluding important information from the underlying seismic data. Accordingly, the present technological advancement can be used to select a subset of representative surfaces such that any subsequent use, such as editing or visualizing, considers only the selected surfaces. Hence, the main advantage of the method is that it may facilitate visualization of and interaction with the surfaces because the faster computation and smaller memory requirements allow for a more responsive system.

This embodiment is quite similar to the previous embodiment example. However, the different application of the selected surfaces dictates that the approach selects surfaces that preserve characteristics better suited for interactive editing and visualization. Accordingly, the surface score functions need to be adjusted such as to reflect those needs.

For interactive editing and visualizing, one would like to select surfaces such that the user can reconstruct the whole set of surfaces and interpolate between them whenever needed. As an example, consider that the interpolation of surface S, denoted $\hat{S}$, can be obtained from reference surfaces $S^A$ and $S^B$ (above and below S, respectively) from a user-provided "height" at a reference location $(x_0, y_0)$. This means that the interpolated surface $\hat{S}(x_0, y_0)$ needs to pass through that point, and it is given by $$\hat{S}(x,y|x_0,y_0)=\alpha(x_0,y_0)S^A(x,y)+(1-\alpha(x_0,y_0))S^B(x,y),$$

where $\alpha(x_0, y_0)$ is the interpolation value at the reference location $(x_0, y_0)$ given by $$\alpha(x_0, y_0) = \frac{S(x_0, y_0) - S^B(x_0, y_0)}{S^A(x_0, y_0) - S^B(x_0, y_0)}.$$

If only one reference surface is available for interpolation, the interpolated surface can be obtained by shifting the reference surface above or below such that the shifted reference surface matches the user-provided height at the reference location.

Accordingly, the method for selection of representative surfaces should use a score function such that the surfaces selected can be used for interpolation without introducing unreasonable errors. As a particular example, one can define the score function $$e_{int}(S, \hat{S}) = \max_{x,y,x_0,y_0} |S(x, y) - \hat{S}(x, y|x_0, y_0)|,$$

which corresponds to the maximum interpolation error and allows the method to select surfaces from which surfaces can be reconstructed with minimal error. Even though this score function captures the requirements of the problem, its computational complexity is quadratic and thus not practical. However, an upper bound to this score can be derived which can be computed with linear complexity (i.e., computation time is directly proportional to the size of the surfaces). In this particular example, by replacing the equations for the interpolated equations in $e_{int}(S,\hat{S})$, we obtain that $$e_{int}(S, \hat{S}) = \max_{x,y,x_0,y_0} |S(x, y) - \hat{S}(x, y | x_0, y_0)| =$$
$$\max_{x,y,x_0,y_0} |(S^A(x, y) - S^B(x, y))(\alpha(x_0, y_0) - \alpha(x, y))| \leq [\max_{x,y}(S^A(x, y) -$$
$$S^B(x, y))][\max_{x_0,y_0} \alpha(x_0, y_0) - \min_{x,y} \alpha(x, y)],$$

meaning that an upper bound for $e_{int}(S,\hat{S})$ is given by the product of two terms with linear complexity. Using the upper bound as the score function instead, the method can minimize the maximum interpolation error even if only indirectly, however, meaning that one may end up selecting more representative surfaces than the direct approach for computing the maximum interpolation. This compromise seems a reasonable trade-off given the reduction in computation complexity and the guaranties on maximum interpolation error.

Determining the Number of Surfaces to Select

For selection of representative surfaces, a controllable parameter is how many surfaces to select. The problem is that, while one would like to select as few surfaces as possible to minimize the subsequent analysis load, the "error" inevitably increases with each reduction due to the fact that the selected surfaces reflect less and less detail of the overall set of surfaces. However, in practice one finds that there is an optimal tradeoff value beyond which reductions of the number of surfaces lead to disproportional large increases in the error. In other words, the optimal tradeoff value represents a point of diminishing returns. This value can then be used in the context of an automated analysis process or, in the case of a user-guided process, it can be used to calculate a data-dependent default to be suggested to the user.

The approach used to determine the optimum tradeoff on the number of surfaces to select is based on two observations: (i) that the initial set of surfaces has some form of "redundancy" such that small reductions on the overall number of surfaces have minor impact on the representation "error" (as characterized by an appropriately defined score function), and (ii) that reductions of the number of selected surfaces beyond a certain point cause the "error" to grow quickly because even broad aspects of the data can no longer be represented. These observations give rise to tradeoff curves like the one depicted in FIG. 7, which shows a plot 702 of the number of surfaces selected (704) as a function of the maximum error (706) (given by the bound of the maximum interpolation error defined in the previous section, in this example). Accordingly, the two observations are demonstrated by 708, corresponding to the observation that reductions of the number of selected surfaces beyond a certain point cause the "error" to grow quickly because even broad aspects of the data can no longer be represented, and 710, corresponding to the observation that reductions of the number of selected surfaces beyond a certain point cause the "error" to grow quickly.

Figure 7:
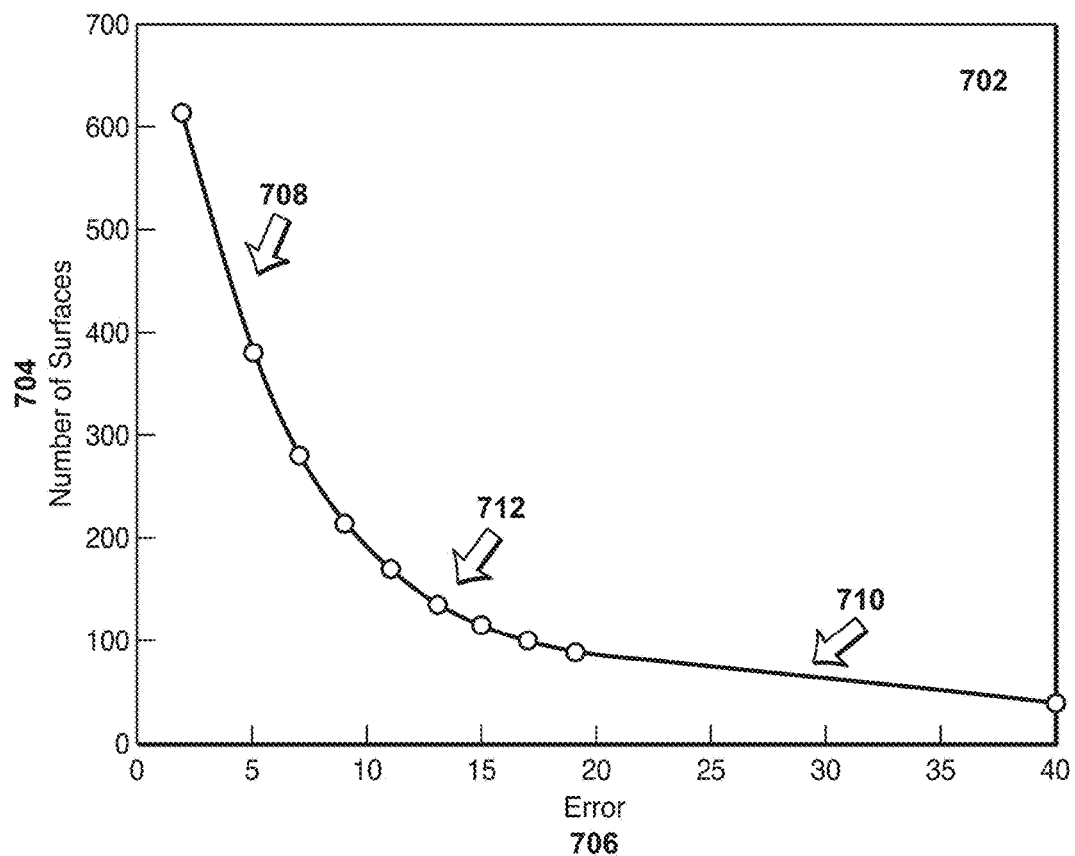
FIG. 7 depicts an exemplary trade-off curve.

Based on these observations, it follows that the number of surfaces to be selected corresponding to the optimum tradeoff is given by the number of surfaces at which there is a transition point (i.e., the "elbow" of the curve), denoted (712) in FIG. 7. This can be detected automatically by finding the number of surfaces for which the curve has maximum curvature, wherein curvature can be defined, for example, as the inverse of the radius of the curve fitting circle. Applying this approach to the curve in FIG. 7 yields that the one should select 135 surfaces out of an original set comprising 600 surfaces.

It is important to note that, as exemplified thus far, this embodiment assumed that it is equally costly to preserve more surfaces or to tolerate the increased error due to a smaller set of selected surfaces. This does not need to be the case in general since the ideal number of representative surfaces will always depend on the ultimate application of the selected surfaces. However, one can bias the previous approach to reflect a difference in cost. For example, if higher error is "more costly" than selecting a few more surfaces, then one can scale the error by how much more costly that is. This has the effect of moving the point of largest curvature such that the number of selected surfaces for the optimum tradeoff will be higher in order to yield a lower error. A similar approach can be applied in the case where the cost of selecting more surfaces is higher than that of higher error.

Computer Embodiment

Figure 8:
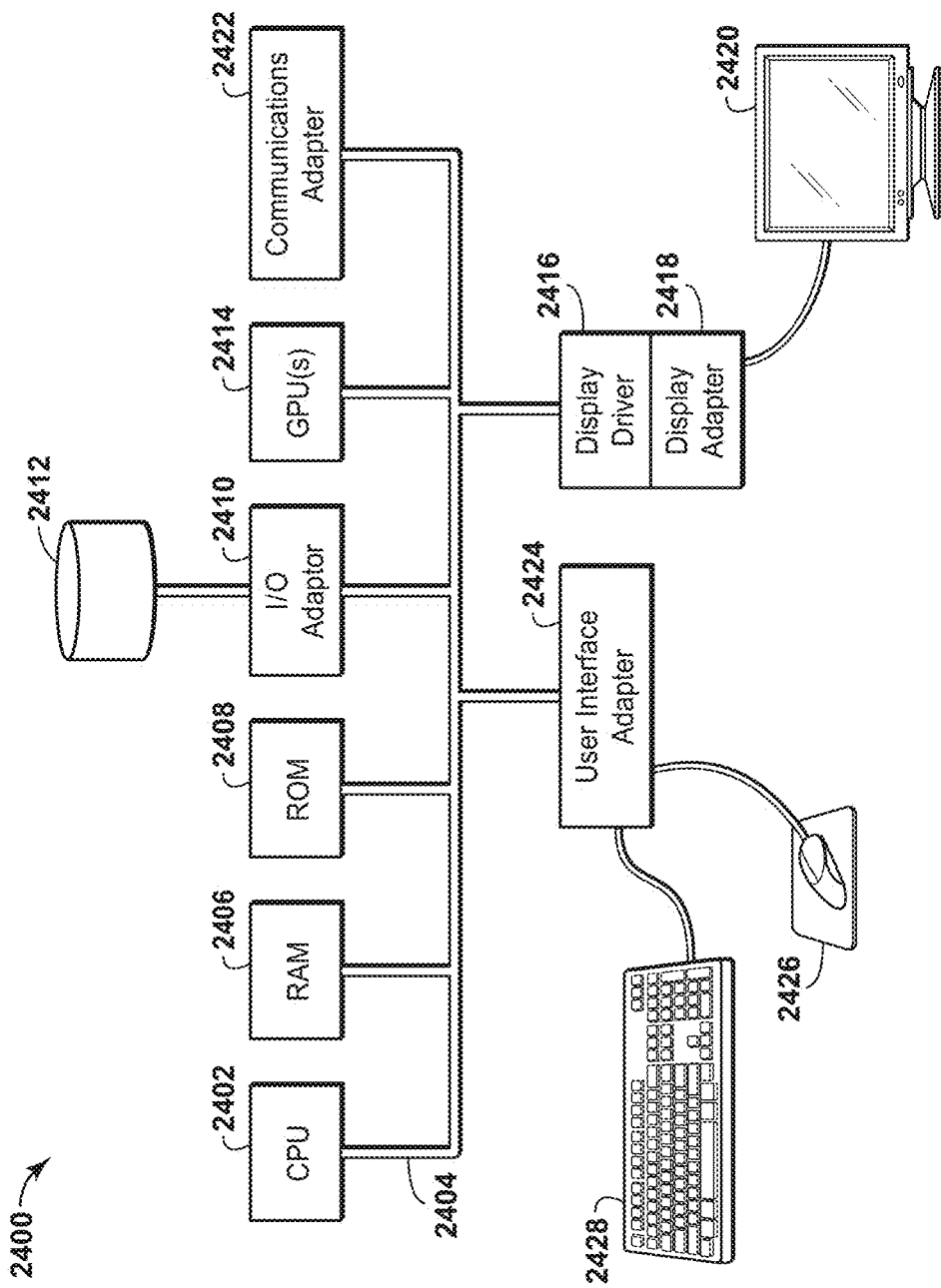
FIG. 8 is an exemplary computer system that can implement the present technological advancement.

FIG. 8 is a block diagram of a computer system that can be used to execute the present techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 8, additional CPUs may be present. Moreover, the computer system 2400 may comprise a networked, multi-processor computer system that may include a hybrid parallel CPU/GPU system. The CPU 2402 may execute the various logical instructions according to various teachings disclosed herein. For example, the CPU 2402 may execute machine-level instructions for performing processing according to the operational flow described.

The computer system 2400 may also include computer components such as nontransitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, GPU(s) 2414, a communications adapter 2422, a user interface adapter 2424, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system.

The display adapter 2418 is driven by the CPU 2402 to control the display driver 2416 on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The foregoing application is directed to particular example embodiments of the present technological advancement. It will be apparent, however, to one skilled in the art, that many modifications and variations to the embodiments described herein are possible. All such modifications and variations are intended to be within the scope of the present invention, as defined in the appended claims. As will be obvious to the reader who works in the technical field, the present technological advancement is intended to be fully automated, or almost fully automated, using a computer programmed in accordance with the disclosures herein.

What is claimed is:

1. A method to identify and extract hydrocarbons from a subsurface area using a representative subset of a plurality of horizon surfaces or surface patches from geophysical imaging data of the subsurface area, comprising:

defining a score function on one or more horizon surfaces or surface patches, wherein the score function provides a measure of relevance of each of the one or more horizon surfaces or surface patches, and further wherein each horizon surface or surface patch corresponds respectively to different layers of rock representing stratigraphic boundaries or to patches of such stratigraphic boundaries;

calculating, by a computer, the score for each of the plurality of horizon surfaces or surface patches with regard to other horizon surfaces or surface patches and further with regard to whether the other horizon surfaces or surface patches have been selected or not for inclusion or exclusion in the subset of the plurality of horizon surfaces;

selecting, by the computer, one or more of the plurality of horizon surfaces or surface patches to be included in the subset of the plurality of horizon surfaces or surface patches or excluded from the subset of the plurality of horizon surfaces or surface patches based on their respective scores;

iteratively repeating the selecting and calculating steps until a stopping condition is reached and the subset of the plurality of horizon surfaces or surface patches is determined;

locating hydrocarbons in the subsurface based upon the subset of the plurality of horizon surfaces or surface patches; and extracting the located hydrocarbons;

wherein the score function is defined (i) such that it minimizes the approximation error in calculating an attribute from the selected subset; and/or (ii) such that it minimizes the approximation error from interpolating surfaces from the selected subset.

2. The method of claim 1, wherein the performing includes using the subset of the plurality of horizon surfaces or surface patches to derive a geologic model that is compatible with the geophysical subsurface imaging data.

3. The method of claim 1, further comprising generating an image of the subset of the plurality of horizon surfaces or surface patches.

4. The method of claim 3, wherein the performing includes using the image to derive a geologic model that is compatible with the geophysical subsurface imaging data.

5. The method of claim 1, wherein the performing includes generating, by a computer, a subsurface attribute from the subset of the plurality of horizon surfaces or surface patches.

6. The method of claim 1, wherein one or more attributes corresponding to properties above, below, and/or at the surface and/or neighboring surfaces or surface patches are used in calculating the score.

7. The method of claim 6, wherein the score characterizes how well a surface or surface patch segments the subsurface into layers or zones.

8. The method of claim 6, wherein the score of a surface or surface patch defines a layer or zone with regards to another surface or surface patch.

9. The method of claim 1, wherein the score function is defined such that selected surfaces are constrained to have a degree of spatial uniformity, spatial separation, or sparseness.

10. The method of claim 1, wherein the iterative process is repeated until the number of selected surfaces reaches a given limit k or the scores of the unselected surfaces are below a given value.

11. The method of claim 10, wherein a tradeoff curve analysis is used to determine the number k of horizon surfaces or surface patches to select.

12. The method of claim 1, wherein the calculating and selecting are performed for the inclusion of the horizon surfaces or surface patches in the subset.

13. The method of claim 1, wherein the calculating and selecting are performed for the exclusion of the horizon surfaces or surface patches from the subset.

* * * * *